(12) United States Patent
Marupaduga

(10) Patent No.: US 11,388,633 B1
(45) Date of Patent: Jul. 12, 2022

(54) MANAGING FREQUENCY BAND ASSIGNMENT BASED ON WIRELESS DEVICE CHARACTERISTICS

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 17 days.

(21) Appl. No.: 16/990,484

(22) Filed: Aug. 11, 2020

(51) Int. Cl.
*H04W 36/00* (2009.01)
*H04W 36/30* (2009.01)
*H04W 72/04* (2009.01)
*H04W 36/06* (2009.01)
*H04W 36/36* (2009.01)

(52) U.S. Cl.
CPC ... *H04W 36/0027* (2013.01); *H04W 36/0022* (2013.01); *H04W 36/0085* (2018.08); *H04W 36/06* (2013.01); *H04W 36/30* (2013.01); *H04W 36/36* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 9,055,544 B2 | 6/2015 | Worrall et al. | |
| 9,078,220 B2 | 7/2015 | Makhlouf et al. | |
| 10,015,070 B1* | 7/2018 | Cai | H04W 36/16 |
| 10,142,878 B1* | 11/2018 | Singh | H04W 28/0226 |
| 10,659,978 B1* | 5/2020 | Marupaduga | H04W 24/10 |
| 2014/0128115 A1* | 5/2014 | Siomina | H04W 24/10 455/501 |
| 2016/0353342 A1 | 12/2016 | Futaki | |
| 2020/0383155 A1* | 12/2020 | Pati | H04W 76/15 |
| 2021/0235340 A1* | 7/2021 | Moosavi | H04W 74/0808 |

* cited by examiner

*Primary Examiner* — Kodzovi Acolatse (57) ABSTRACT

Systems and methods provide inter-band EN-DC coverage combinations to wireless devices in a cell wherein each inter-band coverage has corresponding handover criteria. The method includes determining a power class for at least one wireless device, wherein the power class is one of a high-power class and a low power class. The method additionally includes comparing the handover criteria of at least two inter-band coverage combinations to identify relaxed handover criteria and assigning the high-power class wireless device to an inter-band coverage combination having the relaxed handover criteria.

20 Claims, 7 Drawing Sheets

MANAGING FREQUENCY BAND ASSIGNMENT BASED ON WIRELESS DEVICE CHARACTERISTICS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies such as 4G are often used in combination with newer technologies such as 5GNR.

When multiple RATs are used in combination, access nodes may utilize different frequency bands for deploying different RATs over a wireless air interface. For example, when a 5G RAT is used in combination with a 4G RAT, frequency band 25 may be utilized for the 4G RAT and frequency band 41 may be utilized for the 5G RAT. Alternatively or additionally, the access node may provide an inter-band coverage combination that utilizes frequency band 41 for both the 4G RAT and the 5G RAT. Other inter-band combinations are possible. When multiple access nodes each deploy wireless air interface resources that utilize multiple frequency bands, multiple co-channel overlapping areas or areas of interference may be created. Wireless devices in the overlapping regions may be subject to numerous handovers to attach to a higher frequency band, which can cause overconsumption of resources and poor quality of service for the wireless devices.

Further, as UEs have evolved, in an effort to boost coverage and enhance throughput in wireless networks, higher power class User Equipment(s) (UEs) and/or wireless devices (HPUEs) have been proposed. HPUEs are capable of transmitting at a maximum allowable transmit power that is higher than lower power class UEs (LPUEs). As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

HPUEs generally fall into power classes 1 or 2, whereas LPUEs fall into power class 3 or 4. While a LPUE may not successfully transmit to an access node in a heavily loaded network, an HPUE in the same location may have sufficient transmit power to continue to transmit to the access node. Further, it should be noted that both HPUEs and LPUEs may have specific hardware capabilities such that their transmit power may be greater than or less than the transmit power specified above with respect to each of the power classes.

With any RAT including 3G, 4G, and 5G, mobility or handover decisions are made by the access node or base station based on measurement reports from the wireless devices or UEs. Multiple measurement items, such as reference signal receive power (RSRP), reference signal received quality (RSRQ), and signal to interference and noise ratio (SINR) may be included in the measurement reports. The reports can help determine the signal quality of the serving cell and neighbor cells. Handovers may be triggered when the signal quality for a neighboring cell or a different RAT is better than the signal quality of the serving sector and/or RAT. Handovers, when performed, may cause a wireless device to be served by a different antenna in a different sector or by an antenna in the same sector utilizing a different RAT. Thus, a base station can allow wireless devices to report serving signal quality characteristics and trigger the handover based on these measurements.

While HPUEs and LPUEs have different characteristics and capabilities, existing handover management methods fail to consider the transmission characteristics of the wireless device in conjunction with the frequency bands of the inter-band coverage combinations. Accordingly, a solution is needed that utilizes wireless device characteristics to more proactively assist in making handover determinations to transition wireless devices to a different RAT or sector as appropriate to the particular characteristics of the wireless device.

Overview

Exemplary embodiments described herein include systems, methods, and processing nodes for assigning wireless devices to an inter-band combination based on wireless device characteristics, thereby managing handover determinations for wireless devices in a network. An exemplary method for managing handovers includes providing at least one access node configured to provide inter-band EN-DC coverage combinations to wireless devices in a cell, wherein each inter-band coverage combination has corresponding handover criteria. The method additionally includes determining a power class for at least one wireless device, wherein the power class is one of a high-power class and a low-power class. The method additionally includes comparing the handover criteria of at least two inter-band coverage combinations to identify relaxed handover criteria and assigning the high-power class wireless device to an inter-band coverage combination having the relaxed handover criteria.

An exemplary system is provided for assigning wireless devices to an inter-band combination based on the wireless device characteristics, thereby managing a handover determination for a wireless device communicating with an access node. The system includes at least one access node configured to provide inter-band EN-DC coverage combinations to wireless devices in a cell, each inter-band coverage combination having corresponding handover criteria. The system additionally includes a processor coupled to the access node configured to perform multiple operations. The operations include determining a power class for at least one wireless device, wherein the power class is one of a high-power class and a low power class. The operations additionally include comparing the handover criteria of at least two inter-band coverage combinations to identify relaxed handover criteria and assigning the high-power class wireless device to an inter-band coverage combination having the relaxed handover criteria.

In a further exemplary embodiment, a processing node is configured to perform multiple operations. The processing node determines a power class for at least one wireless device, wherein the power class is one of a high-power class and a low power class and compares the handover criteria of at least two inter-band coverage combinations to identify relaxed handover criteria. The processor further assigns the high-power class wireless device to an inter-band coverage combination having the relaxed handover criteria.

DETAILED DESCRIPTION

Exemplary embodiments described herein include systems, methods, and processing nodes for assigning wireless device to an inter-band combination in an EN-DC network based on characteristics of the wireless device, thereby managing handover thresholds for the wireless devices. Thus, embodiments disclosed herein operate in networks utilizing an EN-DC architecture, which allows devices to access both LTE and 5G simultaneously on the same spectrum or different spectrum bands. For example, when a 5G RAT is used in combination with a 4G RAT, frequency band 25 may be utilized for the 4G RAT and frequency band 41 may be utilized for the 5G RAT. Alternatively or additionally, the access node may provide an inter-band coverage combination that utilizes frequency band 41 for both the 4G RAT and the 5G RAT. Other inter-band combinations are possible.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters and wireless device location within a cell or a sector. Because certain network conditions are likely to result in poor performance of wireless devices in the network, embodiments provided herein assign wireless devices to an inter-band combination based on wireless device characteristics and handover criteria for the inter-band combination. The assignment may be dynamically performed based on reported wireless device characteristics and handover thresholds set at the access node. In embodiments set forth herein, the assigned handover thresholds are determined based in part on the frequency bands present in the inter-band combination.

In exemplary embodiments, a processor or processing node associated with an access node may determine whether a wireless device is a high power class wireless device or a low power class wireless device. In order to make this determination, access nodes may receive communications from wireless device such as HPUEs and LPUEs. For example, the HPUEs and LPUES can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of 2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device interacting with the access node is an HPUE or an LPUE.

The processor or processing node is also programmed to identify handover criteria of the existing inter-band combinations. Handover criteria may include a threshold based on a signal level of UE. For example, the UE may report reference signal received power (RSRP) and the RSRP may be compared to the threshold to determine if a handover should be executed. A higher or relaxed handover threshold is typically present with lower frequency bands and a lower or more stringent handover threshold may be set for higher frequency bands. For example, when an inter-band combination includes bands 25 and 41, the handover threshold is likely to be higher than an inter-band combination including bands 41 and 41. Regardless of how the handover thresholds are set, they may be stored at the access node and retrieved for use. The handover threshold may be, for example, a B1 or inter-RAT threshold used for balancing the load on each RAT. The handover criteria may also include other features in addition to the handover threshold, such as, for example, reference signal received quality (RSRQ), or interference at a particular location based on SINR.

When the access node, processor, or processing node identifies an HPUE, it may be programmed to assign the HPUE to an inter-band combination having a relaxed handover threshold. Because HPUEs have a higher transmit power than LPUEs, they will transmit even when RF conditions are poor because of their higher power. LPUEs have a lower transmit power and therefore have difficult transmitting in poor RF conditions. Accordingly, the assignment of the HPUEs to the inter-band combination having the relaxed handover threshold improves overall network performance. In further exemplary embodiments, LPUEs may be identified and assigned to an inter-band combination having a more stringent handover threshold in order to ensure that the LPUEs are less likely to encounter poor RF conditions.

Therefore, in accordance with embodiments disclosed herein, methods and systems identify wireless device characteristics and characterize handover criteria of inter-band combinations as relaxed or stringent. These steps may be performed in any order. Based on the wireless device characteristics and the identification of the handover criteria, the methods and system assign the wireless devices to an appropriate inter-band combination. Upon assignment to an inter-band combination, dynamic execution of handovers based on the defined criteria can be executed.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of assigning wireless devices to inter-band combinations based on wireless device characteristics and handover criteria of the inter-band combinations and dynamically executing handovers may be implemented as computer-readable instructions or methods, and processing nodes on the network for executing the instructions or methods. The processing node may include a processor included in the access node or a processor included in any controller node in the wireless network that is coupled to the access node.

Embodiments disclosed herein operate in a heterogeneous 5G NR EN-DC network with HPUEs and LPUEs, where there are multiple EN-DC bands. The multiple EN-DC bands have varying threshold parameters. Thus, when a wireless device is connected to a master node, such as an MeNodeB, various handover criteria may exist for addition of a secondary node, such as a SgNodeB. Embodiments disclosed herein assign HPUEs to bands with relaxed handover criteria and assign LPUEs to bands with more stringent handover criteria. All wireless device may be in the same sector that radiates multiple frequencies, each associated with different bands. The addition of a second band helps to obtain high throughput.

Figure 1:
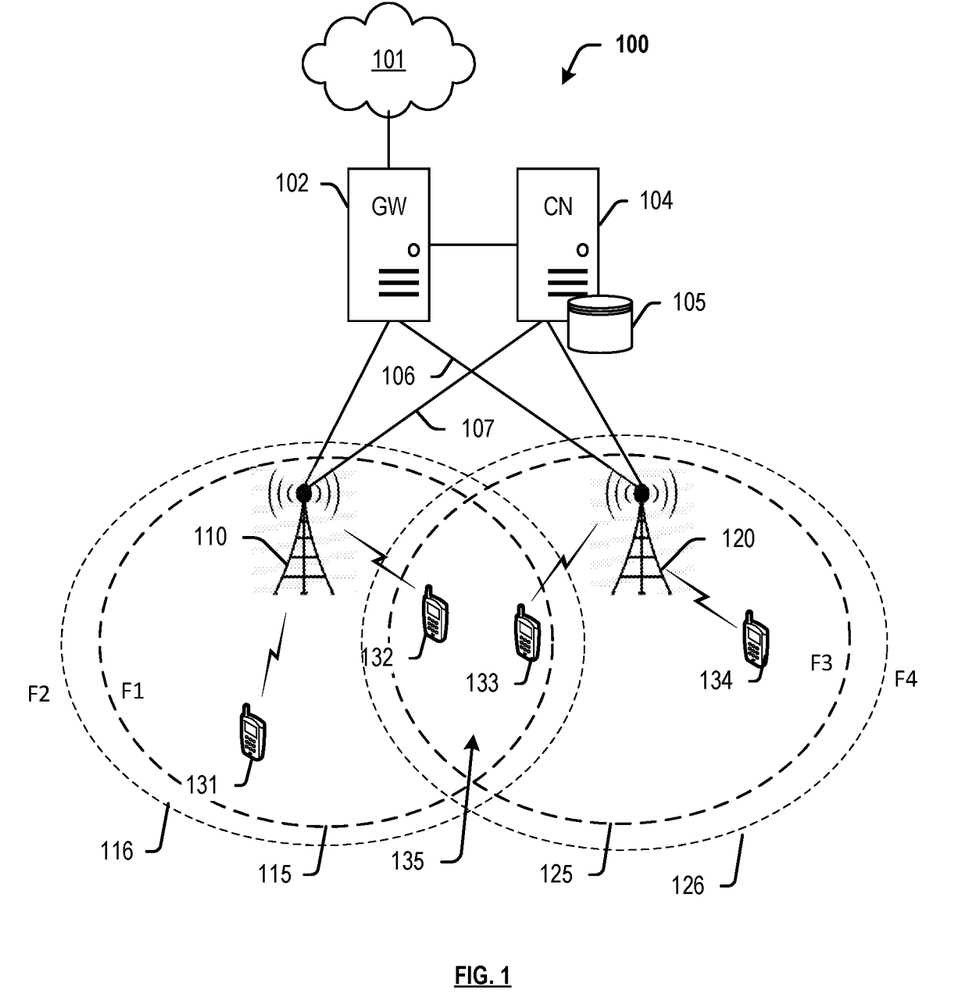
FIG. 1 depicts an exemplary system for wireless communication, in accordance with the disclosed embodiments.

FIG. 1 depicts an exemplary system 100 for use in conjunction with embodiments disclosed herein. System 100 comprises a communication network 101, gateway 102, controller node 104, access nodes 110 and 120, and wireless devices 131, 132, 133, and 134. Access node 110 is illustrated as having a coverage area 115 associated with a first frequency band F1 and a coverage area 116 associated with a second frequency band F2. Thus, access node 110 is configured to deploy radio air interfaces utilizing a first frequency F1 and a second frequency F2. In this exemplary embodiment, access node 110 deploys a radio air interface utilizing frequency F1 over a coverage area 115 and a radio air interface utilizing frequency F2 over a coverage area 116. F1 and F2 may represent an inter-band combination wherein F1 is used for transmission over one RAT and F2 is used for transmission over another RAT. As will be described further below, the frequency bands F1 and F2 may be the same or different. Access node 120 is illustrated as having a coverage area 125 associated with frequency band F3 and a coverage area 126 associated with a frequency band F4. Thus, access node 120 deploys a radio air interface utilizing frequency F3 over a coverage area 125 and a radio air interface utilizing frequency F4 over a coverage area 126. F3 and F4 may represent an inter-band combination wherein F3 is used for transmission over one RAT and F4 is used for transmission over another RAT. Further, additional inter-band combinations may exist in the coverage areas of access nodes 110 and 120. In either case, each access node 110, 120 can deploy one or more radio air interfaces that utilize one or more frequencies, enabling wireless communication with wireless devices 131, 132, 133, 134.

As shown herein, wireless devices 131, 132 attach to access node 110 via frequency bands F1 or F2. Similarly, wireless devices 133, 134 attach to access node 120 via frequency bands F3 or F4. Although access nodes 110, 120 and wireless devices 131, 132, 133, 134 are illustrated in FIG. 1, any number of access nodes and wireless devices can be implemented within system 100.

Wireless devices 131, 132, are located within coverage areas 115 and 116 and access network services from access node 110. Wireless device 133 and 134 are located within coverage areas 125 and 126 and access network services from access node 120. Further, wireless devices 132 and 133 are located within potential interference area 135 formed by an overlap of coverage areas 115, 116, 125, and 126. For example, access nodes 110, 120 may be configured to deploy individual sectors and potential interference area 135 may comprise any overlapping coverage area of the sectors. Thus, and as further described herein, wireless devices 132 and 133 may be in undesirable locations with interference and poor RF performance. The wireless devices thus may meet handover criteria to be handed over to a different RAT and/or different sector. Thus, upon verification of these conditions, the access node 110 may instruct the wireless device 132 to hand over to the access node 120 or the access node 120 may instruct the wireless device 133 to hand over to the access node 110.

Further, a scheduling entity (within, for example, one or both of access nodes 110, 120, or controller node 104) may be configured to allocate resources and provide handover instructions, thereby improving performance in the undesirable area 135. For example, in a 5G network, if antenna parameters are considered to lead to inadequate performance in the area of overlap, the access nodes 110 and 120 may instruct the wireless devices 132 and 133 respectively to hand over to another RAT (e.g. an LTE RAT) or another sector. In embodiments disclosed herein, one or more of access nodes 110, 120 may comprise logic for performing operations for evaluating handover criteria including determining an undesirable area such as potential interference area 135 between coverage areas 115, 125 either based on the SPR or other antenna parameters such as SINR measured over a time period (rather than dynamic measurement) or RSRP reported by the wireless devices. While the potential interference area 135 is shown as an exemplary undesirable area, other types of undesirable areas are within the scope of the disclosure. For example, in addition to areas of overlapping coverage, undesirable areas may include areas with high interference or areas with a weak signal, such as a cell edge.

Access nodes 110, 120 can be any network node configured to provide communication between wireless devices 130-134 and communication network 101, including standard access nodes and/or short range, low power, small access nodes. For instance, access nodes 110, 120 may include any standard access node, such as a macrocell access node, base transceiver station, a radio base station, next generation NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131-134 may be any device, system, combination of devices, or other such communication platform capable of communicating wirelessly with access nodes 110, 120 using one or more frequency bands deployed therefrom. Wireless devices 131-134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. As set forth above, the wireless devices can be HPUEs or LPUEs. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-134. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as handover criteria, including, coordinates of potential interference area 135, positions and characteristics of wireless devices 131-134. The database may further store defined handover thresholds for various inter-band combinations, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
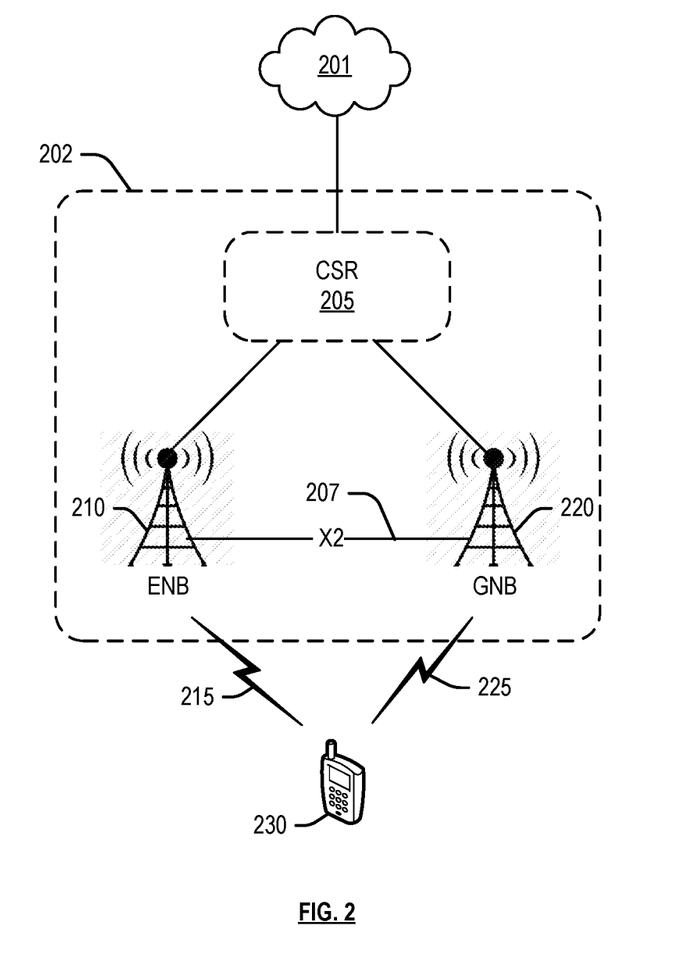
FIG. 2 illustrates an exemplary configuration of a 5G EN-DC radio access network.

FIG. 2 depicts an exemplary system 200 for E-UTRAN-NR Dual Connectivity (EN-DC) using 4G LTE and 5G NR. The access nodes 110 and 120 shown in FIG. 1 may utilize EN-DC using 4G LTE and 5G NR as shown. As shown in FIG. 1, the 4G LTE and 5G NR in a single node may be combined to form an inter-band combination. System 200 includes a communication network 201, a radio access network 202, and a wireless device 230. Radio access network further includes at least a cell site router 205, and access nodes or antennas 210, 220. In embodiments as set forth herein, access nodes 110 and 120 shown in FIG. 1, may include antennas 210 and 220, functioning as shown in FIG. 2. Cell site router 205 can include any network node that is configured to route incoming data packets from network 201 to wireless device 230 via access node(s) 210, 220, and to route outgoing data packets received from the wireless device 230 via access node(s) 210, 220 to the network 201. Therefore, network 201 can include any combination of networks, including a core network, intermediate/backhaul network, or packet data network (PDN). Persons having ordinary skill in the art may note that although only access nodes 210, 220, cell site router 205, and network 201 are illustrated in FIG. 2, other components such as gateways, controller nodes, user plane functions, etc. may be included as well.

In this exemplary embodiment, access node 210 can include an eNodeB, and access node 220 can include a gNodeB. For example, access node 210 can be configured to deploy a wireless interface 215 using a first radio access technology (RAT), e.g. 4G LTE, and access node 220 can be configured to deploy a second wireless interface 225 using a second RAT, e.g. 5G NR. Each RAT can be configured to utilize a different frequency band or sub-band, a different channel size or bandwidth, and so on. For example, the 5G NR wireless interface 225 can be configured to utilize higher frequencies and larger channel bandwidths than the 4G LTE wireless interface 215. Thus, for example, the access node 210 may be an anchor LTE node in band 25 and the access node 220 may utilize band 41. The nodes can alternatively both be in band 41. Different handover criteria generally exist for these different inter-band combinations.

Further, access nodes 210, 220 can be configured to communicate using both RATs at the same time. For example, dual connections can be set up with wireless device 230 using both 4G and 5G air interfaces 215, 225 respectively, the 4G wireless interface 215 being used to transmit control information, and the 5G wireless interface 225 being used to transmit data information. For example, a processing node within system 200 (for example, communicatively coupled to access nodes 210, 220, or any other network node) can be configured to determine whether or not wireless device 230 is capable of communicating using both RATs and instruct the access node 210 to broadcast an indicator in, for example, a system information message. Responsive to the indicator, wireless device 230 can attach to access node 210 which can use the 4G carrier to control and set up a dual connectivity session with wireless device 230. In other words, control information (including SIB messages) is transmitted from the access node 210 using the 4G LTE air interface, while the 5G NR air interface is utilized for transmission of data. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. In an exemplary embodiment utilizing multiple input multiple output (MIMO), wireless device 230 can receive a MIMO data stream using the 5G NR wireless interface, with control signaling that enables the MIMO data stream using the 4G wireless interface.

Further, within radio access network 202, access nodes 210 and 220 can be coupled via a direct communication link 207, which can include an X2 communication link. Access nodes 210 and 220 can communicate control and data information across X2 communication link 207. In an exemplary embodiment, access node 220 includes logic to determine how to allocate data packets between access node 210 and access node 220, wherein the data packets flow between wireless device 230 and a network node on network 201 via CSR 205. Such logic may include a packet data convergence protocol (PDCP) function. Thus, RAN 202 can include a plurality of antenna elements (not shown herein) coupled to access nodes 210 and 220, with different antenna elements configured to deploy a different radio air interface using a different frequency. For example, each antenna element can be configured to deploy a 4G LTE air interface 215 or a 5G NR air interface 225. Different quantities of antenna elements can be configured to deploy (or "assigned" to) a different type of air interface 215, 225, depending on the needs of a network operator or users. Further, in split mode or "concurrent mode", individual antenna elements can be configured to simultaneously deploy at least two different air interfaces 215, 225, which enables wireless device 230 to transmit uplink data via each of the at least two air interfaces 215, 225 simultaneously. Thus, while access nodes that are not capable of utilizing uplink split mode may use the 4G LTE RAT for control transmissions and the 5G NR RAT for data transmissions, access nodes 210 and 220 capable of uplink split mode can receive uplink data via both 4G LTE and 5G NR RAT air interfaces 215, 225. In an exemplary embodiment, the gNodeB portion 220 of RAN 202 is configured with logic to determine a transmission path for data packets traversing RAN 202. The transmission paths can traverse different RAT air interfaces 215, 225, as well as different ports of CSR 205.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 and/or RAN 202 may be, comprise, or include computers systems and/or processing nodes. This includes, but is not limited to: access nodes 110, 120, 210, 220, controller node 104, and/or network 101.

Figure 3:
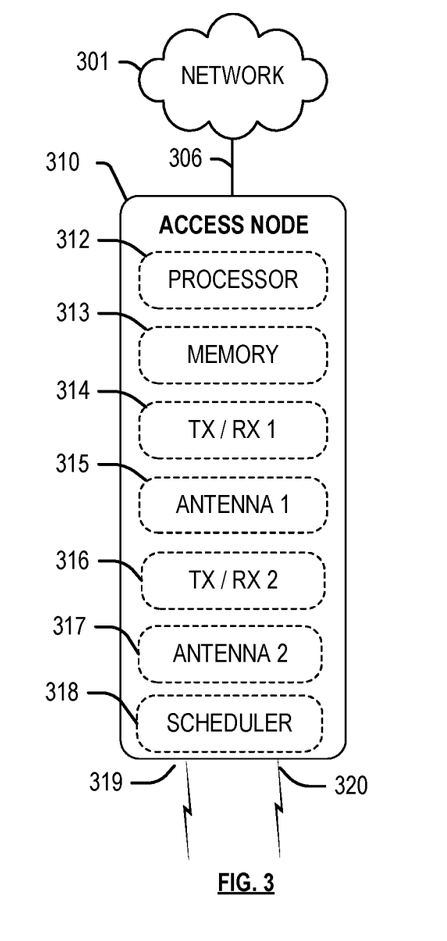
FIG. 3 depicts an access node in accordance with disclosed embodiments.

FIG. 3 depicts an exemplary access node 310. Access node 310 may comprise, for example, a macro-cell access node, such as access node 310 described with reference to FIG. 1. Access node 310 is illustrated as comprising a processor 312, memory 313, transceiver TX/RX 1 314, and antenna 1 315, transceiver TX/RX 2 316, antenna 2, 317, and scheduler 318. The first transceiver 314 and antenna 315 may be provided for deploying a radio air interface utilizing a first frequency band, and the second transceiver 316 and antenna 317 may deploy a radio air interface utilizing a second frequency band. Two pairs of transceivers and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 301. Processor 312 executes instructions stored on memory 313, while transceivers 314 and 316 and antennas 315 and 317 enable wireless communication with other network nodes, such as wireless devices and other nodes. For example, access node 310 may be configured to identify wireless device characteristics, identify and categorize handover criteria, and assign the wireless devices to an inter-band combination having specific handover criteria based on the characteristics of the wireless device. Scheduler 318 may be provided for scheduling resources based on the presence of the wireless devices. These features may be enabled by access node 310 comprising two co-located cells, or antenna/transceiver combinations that are mounted on the same structure. Network 301 may be similar to network 101 discussed above. The wireless devices may operate in carrier aggregation mode, during which a wireless device utilizes more than one carrier, enabling the wireless devices to communicate with access node 310 using a combination of resources from multiple carriers.

Figure 5:
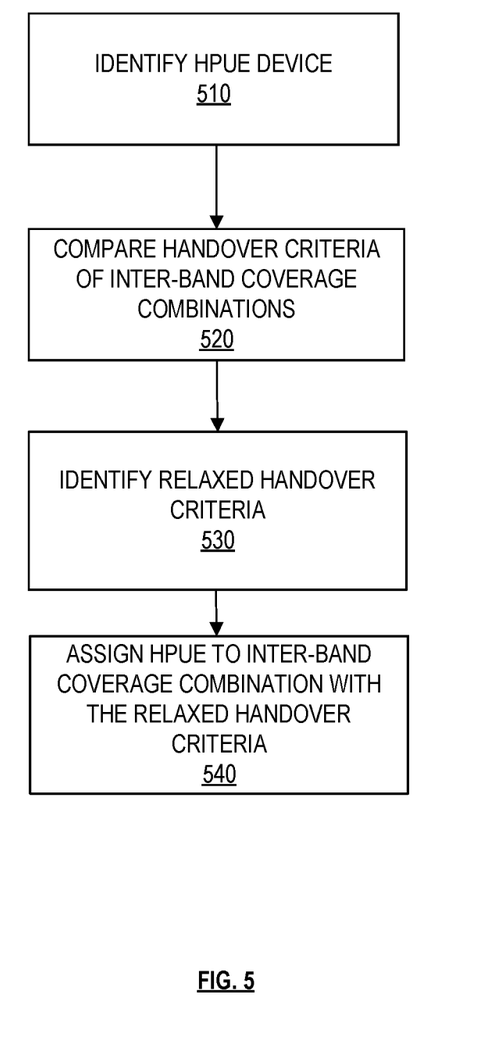
FIG. 5 depicts an exemplary method for assigning a wireless device to an inter-band combination based on handover criteria in accordance with disclosed embodiments.

Further, instructions stored on memory 313 can include instructions for dynamically assigning a wireless device to an inter-band combination, which will be further explained below with reference to FIGS. 5-7. The instructions may facilitate identifying characteristics of UEs, such as transmit power, identifying handover criteria of inter-band combinations and characterizing the handover criteria, and assigning the UEs based on their characteristics to an inter-band combination having particular handover criteria.

Figure 4:
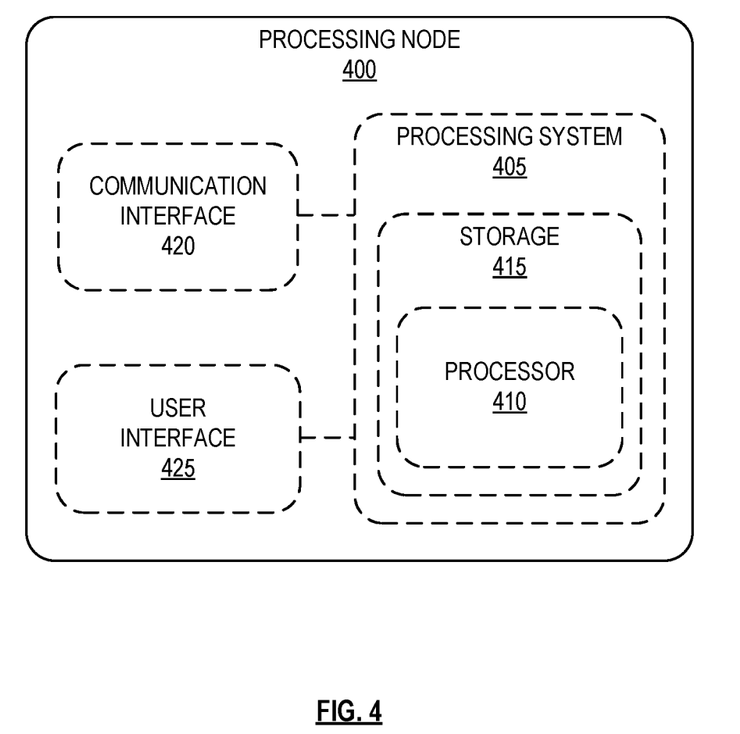
FIG. 4 depicts a processing node in accordance with the disclosed embodiments.

FIG. 4 depicts an exemplary processing node 400, which may be configured to perform the methods and operations disclosed herein for assigning wireless devices to an inter-band combination based on the handover criteria of the inter-band combination and the characteristics of the wireless device. In some embodiments, processing node 400 may be included in an access node, such as access node 110, 120, 210, 220, or 310. In further embodiments, processing node 400 may be included in controller node 104 and may be configured for controlling the access nodes.

Processing node 400 may be configured for performing wireless device assignment and handover management by assigning wireless devices to inter-band combinations based on wireless device characteristics. The assignment may occur dynamically in real time based on an identification of a wireless device characteristic, such as a whether the wireless device is an HPUE. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

The disclosed methods for assigning wireless devices to inter-band combinations based on handover criteria and wireless device characteristics are further discussed with reference to FIGS. 5-7. FIG. 5 illustrates an exemplary method 500 for assignment of wireless devices to inter-band combinations. The method may occur in dynamically in real time or at predetermined intervals. Method 500 may be performed by any suitable processor discussed herein, for example, a processor included in access node 110, 120, 210, 220, or 312, processor 410 included in processing node 400, or a processor included in controller node 104. For discussion purposes, as an example, method 500 is described as being performed by a processor included in access node 110.

Method 500 starts in step 510 when the access node identifies an HPUE device. As set forth above, the identification may be made based on numerous methods including communications received at the access node from the wireless device. For example, the HPUEs and LPUES can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of 2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device is interacting with the access node is an HPUE or an LPUE.

In step 520, the access node compares handover criteria of inter-band coverage combinations. The handover criteria may include, for example, a threshold value for RSRP. The criteria may include inter RAT thresholds to neighboring sectors as well as thresholds for handing over from different RATs such as 5G to 4G to 3G. Other parameters may also be included in the handover criteria, such as interference measured by SINR, or detection that a wireless device is communicating from an area of undesirable location. The undesirable location may be based on known antenna parameters or defined areas such as cell edge areas or areas of overlapping coverage. Although undesirable locations can be determined dynamically, they may also be determined based the stored parameters without dynamic measurement.

In step 530, the access node identifies the inter-band combination having the most relaxed handover criteria. In embodiments set forth herein, the access node compares the threshold values for RSRP between at least two inter-band coverage combinations. Based on the comparison, the access node identifies a relaxed threshold (higher threshold) and a stringent threshold (lower threshold). While in embodiments described herein, the comparison may be based on an RSRP threshold, other handover criteria may be included in the determination of relaxed vs. stringent. For example, if two inter-band combinations have the same RSRP threshold, other criteria such as location and interference level may also be considered to determine which inter-band threshold is relaxed and which inter-band threshold is stringent. Furthermore, three or more inter-band combinations may be present. In such a case, the access node may identify the most relaxed handover criteria of all existing inter-band combinations. Generally speaking, the handover criteria are different for the different inter-band combinations. The handover threshold for a lower frequency band is generally higher than the handover threshold for higher bands. The lower frequency bands have the capability to accommodate additional cell edge users as coverage is wider. Higher frequency bands generally have a shorter radius and thus, a lower handover threshold.

In step 540, the access node assigns the identified HPUE to the inter-band-coverage combination having the relaxed handover criteria. The assignment may be accomplished, for example, by an instruction sent by the access node to the wireless device for example by utilizing an RRC connection reconfiguration message or another message directed specifically to the wireless device. As a result of the assignment, the HPUE will attach to the inter-band combination having the relaxed handover criteria. Thus, as network conditions deteriorate, the UEs having the stronger signal transmission characteristics, i.e., HPUEs, are likely to be able to continue to transmit when conditions fall between those of the stringent handover criteria and the relaxed handover criteria, thereby improving overall network performance. A handover may be initiated when the relaxed criteria are met, for example, by providing an HPUE connecting with a 4G LTE node with access to the paired 5G NR node when the criteria are met. For example, wireless device may be connected to a master node, which may be a 4G node, and the handover criteria may determine when a secondary node, such as a 5G node will be assigned to the wireless device. An HPUE will be subject to more relaxed handover criteria and thus will not attach to the secondary node as quickly as other UEs when subject to deteriorating network conditions. In order for the secondary node to attach, the master node receives an RSRP report from the wireless device and compares it to the handover criteria.

Figure 6:
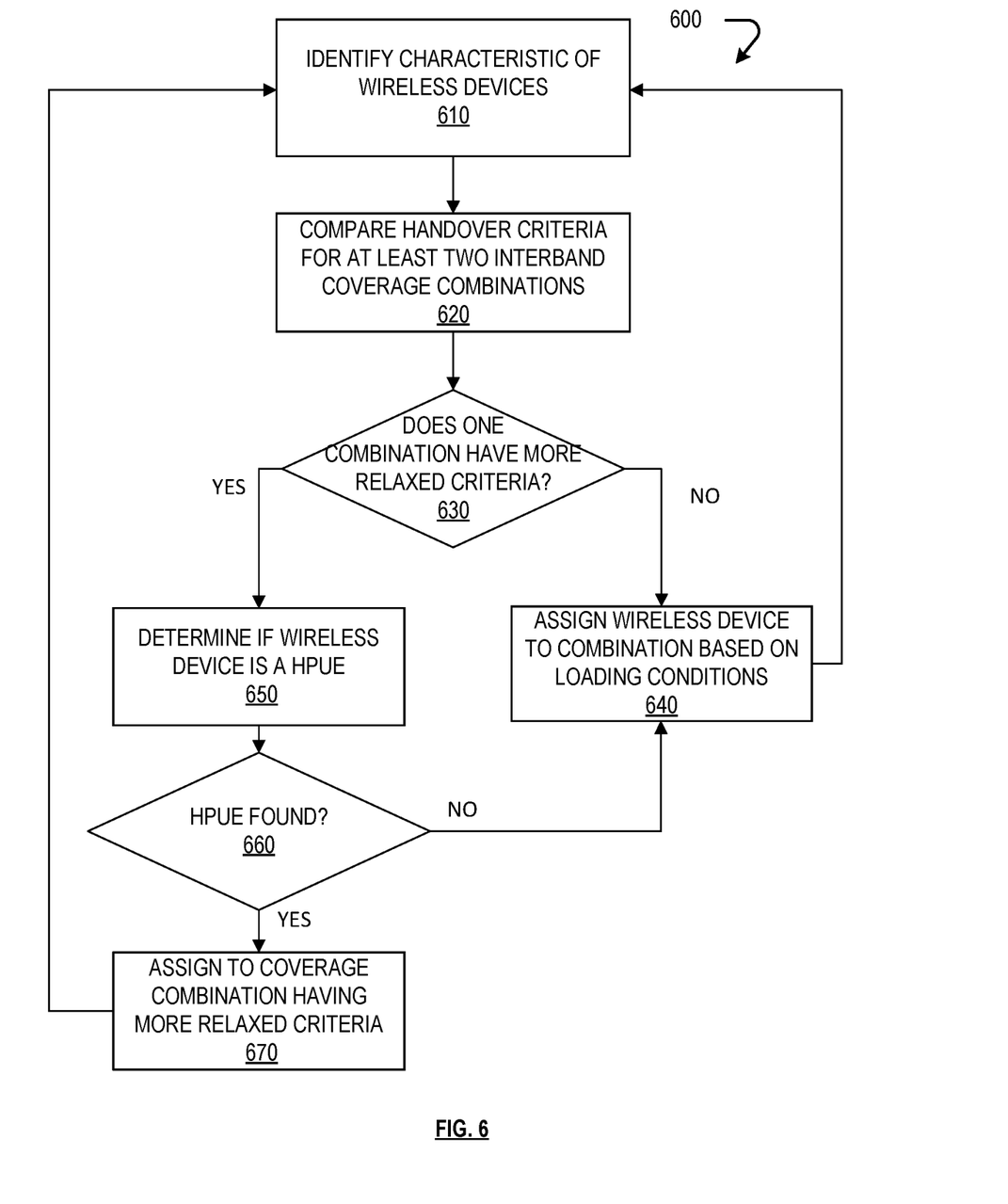
FIG. 6 depicts another exemplary method for assigning wireless devices to an inter-band combination based on handover criteria in accordance with disclosed embodiments.

The method of FIG. 6 illustrates a method 600 for dynamic assignment of UEs to an inter-band combination based on characteristics of the UE and handover criteria of the inter-band combinations. Method 600 may be performed by any suitable processor discussed herein, for example, a processor included in access node 110, 120, 210, 220 or 312, processor 410 included in processing node 400, or a processor included in controller node 104. For discussion purposes, as an example, method 600 is described as being performed by a processor included in access node 110.

In step 610, the access node determines a characteristic of the wireless device. In embodiments set forth herein, the access node may determine, for example, a transmit power of the wireless device, a chipset of the wireless device, or PHR of the wireless device. The determination may be made at the access node, for example, based on notifications sent by the wireless device to the access node using any of the methods set forth above with respect to step 510 in FIG. 5.

In step 620, the access node compares handover criteria for at least two inter-band coverage combinations. Based on the comparison in step 620, the access node determines in step 630 if one of the inter-band coverage combinations has more relaxed handover criteria than the other inter-band coverage combinations. As set forth with respect to method of FIG. 5, this determination can be made, for example, when the access node compares the threshold values for RSRP between at least two inter-band coverage combinations. Based on the comparison, the access node identifies a relaxed threshold (higher threshold) and a stringent threshold (lower threshold). While in embodiments described herein, the comparison may be based on an RSRP threshold, other handover criteria may be included in the determination of relaxed vs. stringent. For example, if two inter-band combinations have the same RSRP threshold, other criteria such as location of the wireless device and interference level experienced in the location may also be considered to determine which inter-band threshold is relaxed and which inter-band threshold is stringent. Furthermore, three or more inter-band combinations may be present. In such a case, the access node may identify the most relaxed handover criteria of all existing inter-band combinations.

If in step 630, the access nodes determine that the handover criteria for the wireless devices are equivalent, then it may assign the wireless device to a particular inter-band combinations based on loading conditions. For example, if one inter-band combination has fewer wireless devices connecting, the access node may assign the wireless devices to that inter-band combination in order to balance the network load in step 640. However, in step 630, if one inter-band coverage combination is found to have more relaxed handover criteria than other inter-band coverage combinations, the access node determines if the wireless device is an HPUE in step 650. This determination may be based on the characteristics of the wireless device identified in step 610.

If no HPUE is found in step 660, the access node may assign the wireless device to an inter-band combination based on loading conditions in step 640. However, the wireless device is determined to be an HPUE in step 660, the access node may assign the HPUE to the coverage combination having the more relaxed handover criteria in step 670. An assignment instruction may be sent by the access node to the wireless device for example by utilizing an RRC connection reconfiguration message or another message directed specifically to the wireless device. Thus, as network conditions deteriorate, the UEs having the stronger signal transmission characteristics, i.e., HPUEs are likely to be able to continue to transmit when conditions fall between those of the stringent handover criteria and the relaxed handover criteria, thereby improving overall network performance. A handover may be initiated when the relaxed criteria are met, for example, by providing an HPUE connecting with a 4G LTE node with access to the paired 5G NR node.

Figure 7:
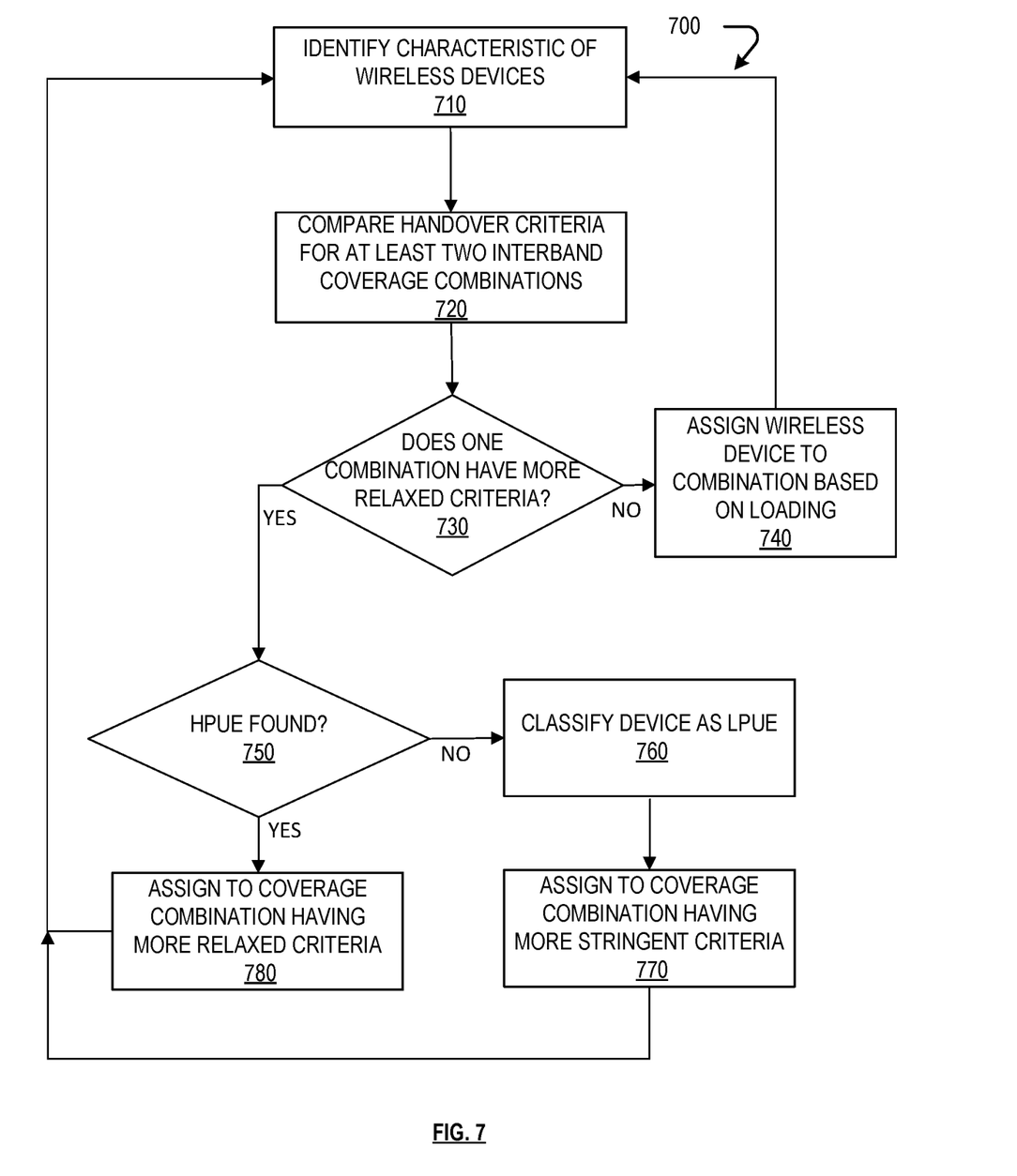
FIG. 7 depicts another exemplary method for assigning wireless devices to an inter-band combination based on handover criteria in accordance with disclosed embodiments.

The method of FIG. 7 illustrates a method 700 for dynamic assignment of UEs to an inter-band combination based on characteristics of the UE and handover criteria of the inter-band combinations. Method 700 may be performed by any suitable processor discussed herein, for example, a processor included in access node 110, 120, 210, 220, or 312, processor 410 included in processing node 400, or a processor included in controller node 104. For discussion purposes, as an example, method 700 is described as being performed by a processor included in access node 110.

In step 710, the access node determines a characteristic of the wireless device. In embodiments set forth herein, the access node may determine, for example, a transmit power of the wireless device, a chipset of the wireless device, or PHR of the wireless device. The determination may be made at the access node, for example, based on notifications sent by the wireless device to the access node using any of the methods set forth above with respect to step 510 in FIG. 5.

In step 720, the access node compares handover criteria for at least two inter-band coverage combinations. Based on the comparison in step 720, the access node determines in step 730 if one of the inter-band coverage combinations has more relaxed handover criteria than the other inter-band coverage combinations. As set forth with respect to the method of FIG. 5, this determination can be made, for example, when the access node compares the threshold values for RSRP between at least two inter-band coverage combinations. Based on the comparison, the access node identifies a relaxed threshold (higher threshold) and a stringent threshold (lower threshold). While in embodiments described herein, the comparison may be based on an RSRP threshold, other handover criteria may be included in the determination of relaxed vs. stringent. For example, if two inter-band combinations have the same RSRP threshold, other criteria such as location of the wireless device and interference level experienced in the location may also be considered to determine which inter-band threshold is relaxed and which inter-band threshold is stringent. Furthermore, three or more inter-band combinations may be present. In such a case, the access node may identify the most relaxed handover criteria of all existing inter-band combinations.

If in step 730, the access nodes determines that the handover criteria for the wireless devices are equivalent, then it may assign the wireless device to a particular inter-band combinations based on loading conditions. For example, if one inter-band combination has fewer wireless devices connecting, the access node may assign the wireless devices to that inter-band combination in order to balance the network load in step 740. However, in step 730, if one inter-band coverage combination is found to have more relaxed handover criteria than other inter-band coverage combinations, the access node determines if the wireless device is an HPUE in step 750. This determination may be based on the characteristics of the wireless device identified in step 710. If the wireless device is found to be an HPUE in step 750, the access node may assign the HPUE to the coverage combination having the more relaxed handover criteria in step 780. However, if the device is not an HPUE, the access node may classify the wireless device as an LPUE in step 760. Once the wireless device is classified as an LPUE, the access node may assign the wireless device to the combination having the more stringent handover criteria in step 770.

In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner. Additionally, in order to optimize a heterogeneous network, the methods disclosed may be performed for multiple devices in the network so that the wireless devices can be appropriately assigned.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   providing a plurality of access nodes configured to provide inter-band EN-DC coverage combinations to wireless devices in a cell, each inter-band coverage combination having corresponding handover criteria, the access nodes including at least a master node utilizing a first frequency band and a second frequency band and a secondary node;
   determining a power class for at least one wireless device, wherein the power class is one of a high-power class and a low power class;
   comparing the handover criteria of at least two inter-band coverage combinations to identify relaxed handover criteria, wherein the first frequency band is higher than the second frequency band and the master node stores more relaxed handover criteria for an inter-band coverage combination utilizing the second frequency band than for an inter-band coverage combination utilizing the first frequency band; and
   assigning the high-power class wireless device to the inter-band coverage combination having the relaxed handover criteria, the relaxed handover criteria determining assignment of the high-power class wireless device to the secondary node.

2. The method of claim 1, wherein the at least one wireless device communicates with the master node and the handover criteria determine when the secondary node is assigned to the at least one wireless device.

3. The method of claim 2, wherein the master node is a 4G node and the secondary node is a 5G node.

4. The method of claim 2, further comprising receiving an RSRP report at the master node from the at least one wireless device for comparison to the handover criteria.

5. The method of claim 1, wherein the access nodes communicating over the lower frequency band have the relaxed handover criteria and access nodes communicating over the higher frequency band have more stringent handover criteria.

6. The method of claim 1, further comprising optimizing a heterogeneous network by assigning multiple high-power class wireless devices in the heterogeneous network based on the handover criteria.

7. The method of claim 1, further comprising assigning low power class wireless devices to inter-band coverage combinations having more stringent handover criteria.

8. The method of claim 1, wherein the handover criteria include an RSRP threshold.

9. A system comprising:
   at least one access node configured to provide inter-band EN-DC coverage combinations to wireless devices in a cell, each inter-band coverage combination having corresponding handover criteria, wherein the access node is a master node utilizing a first frequency band and a second frequency band;
   at least one secondary node:
   a processor coupled to the access node configured to perform operations comprising,
      determining a power class for at least one wireless device, wherein the power class is one of a high-power class and a low power class;
      comparing the handover criteria of at least two inter-band coverage combinations to identify more relaxed handover criteria, wherein the first frequency band is higher than the second frequency band and the master node stores more relaxed handover criteria for an inter-band coverage combination utilizing the second frequency band than for an inter-band coverage combination utilizing the first frequency band; and
      assigning the high-power class wireless device to an inter-band coverage combination having the more relaxed handover criteria for determining assignment of the high-power class wireless device to the secondary node.

10. The system of claim 9, wherein the at least one wireless device communicates with the master node and the handover criteria determine when the secondary node is assigned to the at least one wireless device.

11. The system of claim 10, wherein the master node is a 4G node and the secondary node is a 5G node.

12. The system of claim 10, wherein the master node receives an RSRP report from the at least one wireless device for comparison to the handover criteria.

13. The system of claim 9, wherein access nodes communicating over a low frequency band have the more relaxed handover criteria and access nodes communicating over a higher frequency band have more stringent handover criteria.

14. The system of claim 9, wherein the access nodes optimize a heterogeneous network by assigning multiple high-power class wireless devices in the heterogeneous network based on the handover criteria.

15. The system of claim 9, wherein the access nodes assign low power class wireless devices to inter-band coverage combinations having more stringent handover criteria.

16. A processing node configured to perform operations comprising:
   determining, in a network having a master node utilizing at least a first frequency band and a second frequency band and a secondary node, a power class for at least one wireless device, wherein the power class is one of a high-power class and a low power class;
   comparing handover criteria of at least two inter-band coverage combinations to identify relaxed handover criteria, wherein the first frequency band is higher than the second frequency band and the master node stores more relaxed handover criteria for an inter-band coverage combination utilizing the second frequency band than for an inter-band coverage combination utilizing the first frequency band; and
   assigning the high-power class wireless device to an inter-band coverage combination having the relaxed handover criteria for determining assignment of the high-power class wireless device to the secondary node.

17. The processing node of claim 16, wherein the at least one wireless device communicates with the master node and the handover criteria determine when the processing node assigns the secondary node to the wireless device.

18. The processing node of claim 17, wherein the master node is a 4G node and the secondary node is a 5G node.

19. The processing node of claim 16, wherein the operations further comprise receiving an RSRP report from the at least one wireless device for comparison to the handover criteria.

20. The processing node of claim 16, further comprising assigning the more relaxed handover criteria to access nodes communicating over a low frequency band and more stringent handover criteria to access nodes communicating over a higher frequency band.

* * * * *